United States Patent [19]
Guthrie et al.

[11] Patent Number: 5,607,786
[45] Date of Patent: Mar. 4, 1997

[54] FUEL CELL TRANSPORT FRAME

[75] Inventors: Robin J. Guthrie, East Hartford; Thomas J. Corrigan, Vernon, both of Conn.

[73] Assignee: International Fuel Cells Corporation, So. Windsor, Conn.

[21] Appl. No.: 435,693

[22] Filed: May 5, 1995

[51] Int. Cl.$^6$ .................................................. H01M 12/08
[52] U.S. Cl. ................................ 429/34; 429/18; 429/37; 429/38
[58] Field of Search ................................ 429/18, 34, 37, 429/38

[56] References Cited

U.S. PATENT DOCUMENTS

| | | | |
|---|---|---|---|
| 3,615,851 | 10/1971 | Eysel | 429/37 |
| 4,642,274 | 2/1987 | Tsutsumi et al. | 429/35 |
| 4,692,391 | 9/1987 | Hirota | 429/34 |
| 4,873,155 | 10/1989 | Hirota et al. | 429/26 |
| 4,997,728 | 3/1991 | Onoda et al. | 429/34 |
| 5,419,981 | 5/1995 | Golben | 429/37 |

*Primary Examiner*—Maria Nuzzolillo
*Attorney, Agent, or Firm*—Alan C. Cohen

[57] ABSTRACT

The present invention discloses a transport frame for transporting and maintaining a fuel cell stack assembly in a fixed position. The fuel cell stack asembly which is under compression by a top and bottom plate held together by tie rods positioned at the corners of each plate. The top and bottom plates are then mounted to a rigid frame for transporting the fuel cell. The tie rods being attached to mounts in the base plate of the rigid frame and an insulated attachment between the top plate of the fuel cell stack frame and the rigid frame is made. The fuel cell stack assembly being electrically insulated from the rigid frame.

3 Claims, 3 Drawing Sheets

5,607,786

FUEL CELL TRANSPORT FRAME

TECHNICAL FIELD

The technical field to which this invention pertains is fuel cell stacks and in particular to electrically insulating mounting means for mounting fuel cell stacks to support structures.

BACKGROUND OF THE INVENTION

Fuel cells have been used for years to produce electricity through a spontaneous chemical reaction between a fuel and an oxidant in the presence of a catalyst. Fuel cells generally comprise an electrolyte, either solid or a liquid material, which is in contact with and sandwiched between an anode and a cathode electrode. During operation a fuel, generally in a gaseous state, is introduced into the interface between the anode and the electrolyte and an oxidant, also generally a gas, is introduced simultaneously into the interface of the cathode and the electrolyte, where the spontaneous reaction takes place to produce electricity.

To produce large amounts of electricity it is common practice to stack a number of these cells together. In forming a stack of cells it is important that the stack be stable and sealed so that as it is operating or being transported none of the gases or electrolyte (if liquid) is allowed to either escape from the cell stack or cross over from one cell to another. Therefore, the cell stack is typically held under a compressive load to maintain this integrity using tierods incorporated into a cell stack frame. In addition, the fuel cell stack frame is then mounted onto a rigid support frame to give greater support to the fuel cell stack, particularly protection against lateral movement which may occur during transport of the stack or in the event of an earthquake or other similar forces. The rigid support frame is also electrically insulated from the fuel cell stack therefore protecting persons coming near the fuel cell stack from possible contact with the electrically live stack.

A typical fuel cell stack mounting apparatus is shown in FIG. 1 in which a fuel cell stack assembly 4 is positioned within a fuel cell stack holder frame 6 comprising a top end plate 8 and a bottom end plate 10 each positioned at the opposite end of the cell stack assembly 4 and perpendicular to the electrodes 12. The compressive forces are applied through the four tie rods 14 which are positioned one each at the corners 16 of the top end plate 8 and descending substantially perpendicular to the cell electrodes 12 to the mirror image corners 18 of the bottom end plate 10. The tie rods are attached at each of the corners of the top and bottom end plates 16 and 18 by passing a threaded end portion of the tie rod 14 through an opening in the corner and are fixed in place via threaded nuts 20. A dielectric washer 22 is placed between the nut 20 and the bottom end plate surface 24 and a dielectric sleeve 26 surrounds the tie rod portion in contact with the bottom and top end plate 10, 8 as it passes through the hole. The fuel cell stack holder frame 6 is then mounted onto a rigid fuel stack mounting frame 27. The mounting frame 27 comprises a rigid box-like structure having top beams 28 bottom beams 30 and two or more side or corner beams 32, 34. The top end plate 8 of the fuel cell frame 6 is horizontally affixed to the top beam 28 of the fuel cell rigid frame 27 by dielectric mount 36 and the bottom plate 10 of the fuel cell stack frame 6 is affixed to the bottom beam 30 of the rigid frame 27 by four ceramic insulating members 38.

This structure offers support for the fuel cell stack and maintains a safe electrically insulated structure to permit safe transport of the fuel cell stack and to prevent damage to the fuel cell in the event of earthquake or other catastrophe. However, the use of the ceramic insulators to mount the fuel cell stack has certain shortcomings when the fuel cell stack is moved in that the insulators are high in compressive strength, but have a very low flex tolerance so that when the stack is subjected to horizontal pressures or the frame is deflected by external loads the insulators may crack, and therefore need to be replaced. This most often happens during transport of the cell stack to the operation site.

Therefore, what is needed in this art area is an improved insulating and mounting structure between the fuel cell frame and rigid support frame which is cost effective and durable, and preferably will permit lighter weight rigid frames to be used.

DISCLOSURE OF THE INVENTION

The present invention is a fuel cell frame in which the fuel cell stack is mounted and held under compression within the frame. The frame comprises a top plate and a bottom plate positioned on the top and the bottom of the fuel cell stack assembly respectively. The two plates are connected by connecting means. The connecting means are fixed in place at both the top and the bottom plates and am electrically insulated from the two plates. The fuel cell stack assembly and frame are then positioned in a transport frame for fixing the fuel cell stack assembly and fuel cell stack frame such that the fuel cell stack frame is mounted and supported by one or more of the connecting means and said transport means is electrically insulated from the fuel cell stack.

BEST MODE FOR CARRYING OUT THE INVENTION

The present invention and the best mode are most clearly understood with reference to the Figures. Therefore, the following is a description referring to those Figures which are intended solely as one embodiment and is not intended to be limited to that sole embodiment.

Figure 1:
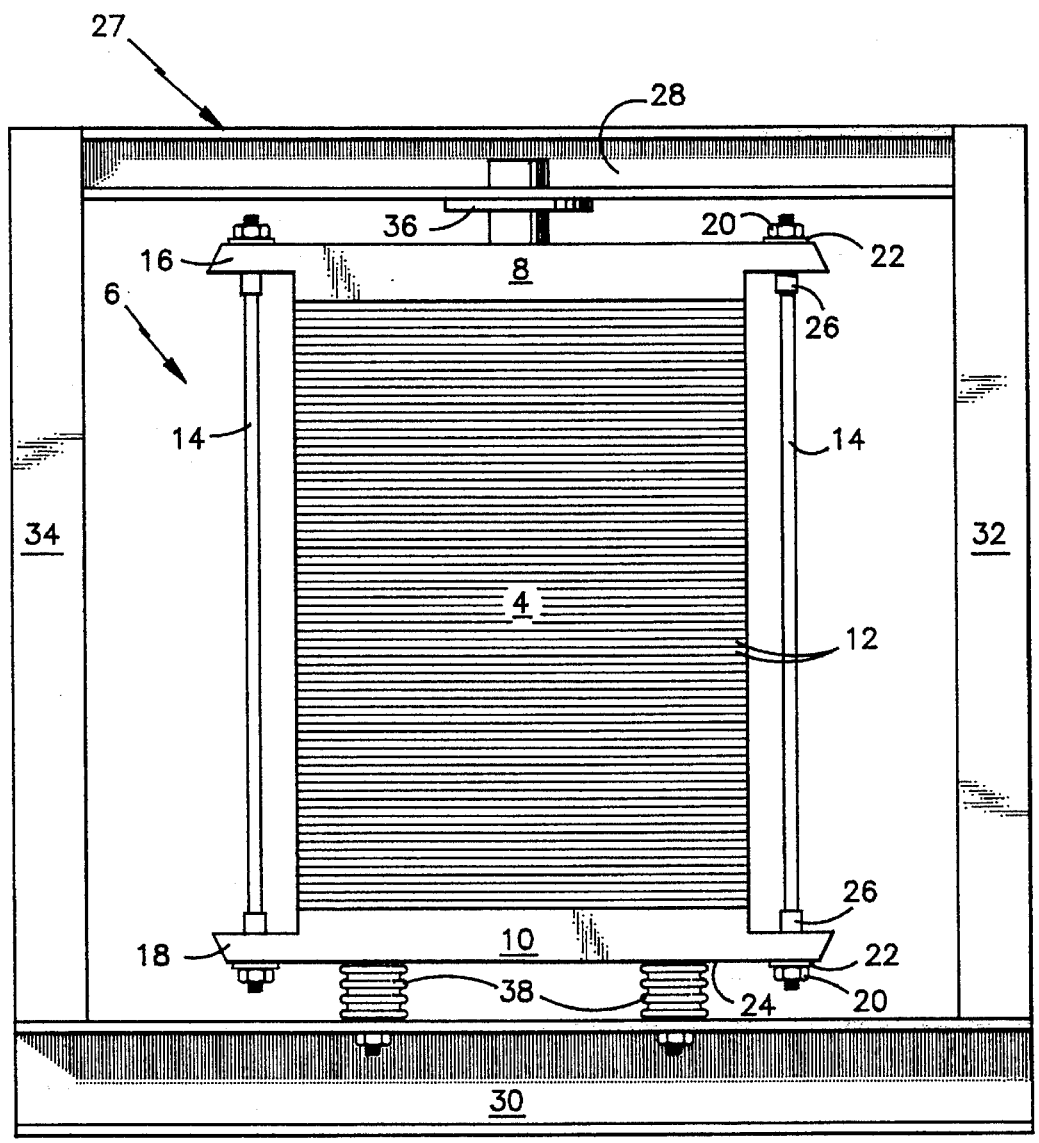
FIG. 1 is a depiction of the prior art fuel cell stack frame and transport frame.
Figure 2:
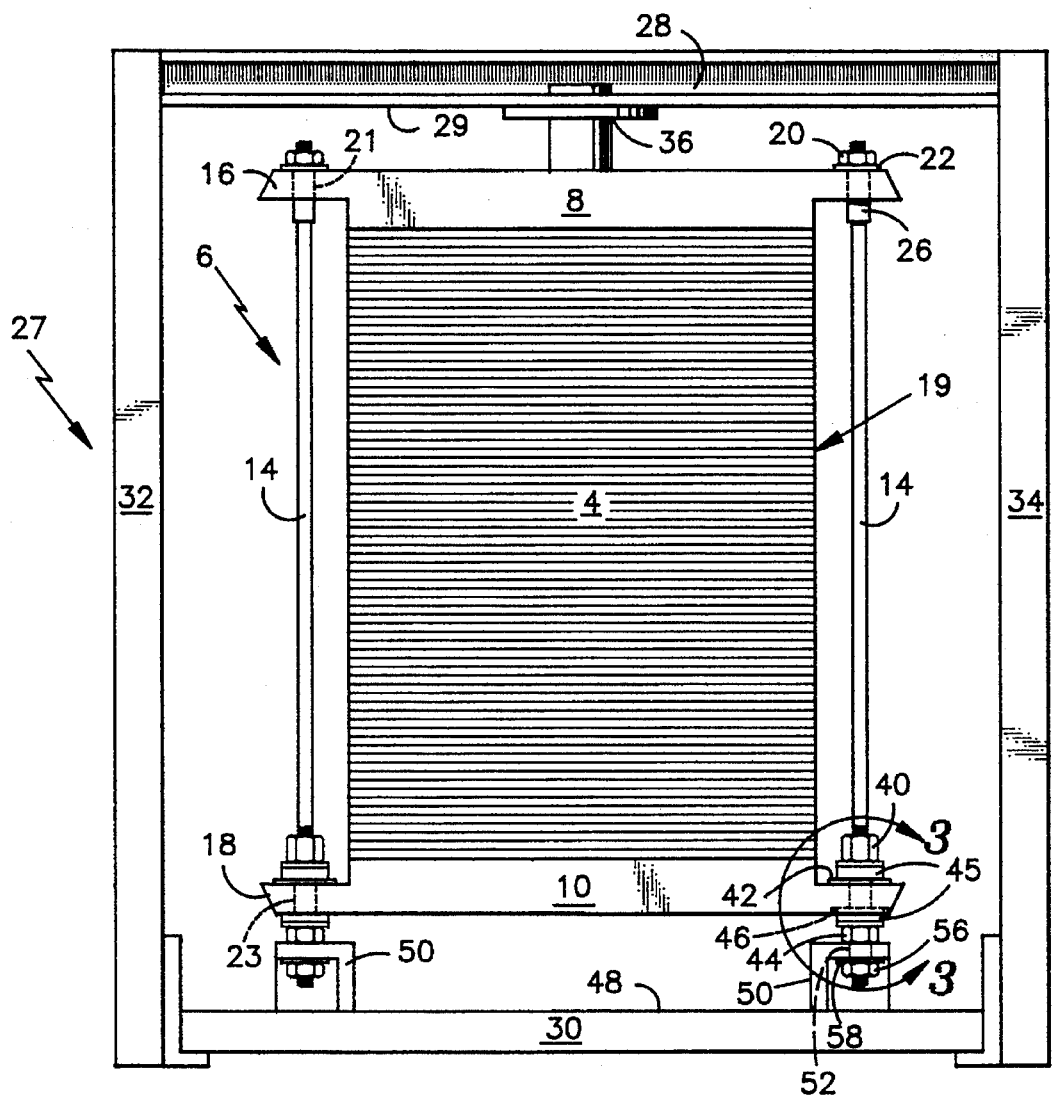
FIG. 2 is a depiction of one embodiment of the current invention showing the fuel cell stack assembly and mounting frame.

FIG. 2 depicts a fuel cell stack assembly 4, comprising a plurality of fuel cells each having an anode and a cathode electrode positioned within a fuel cell stack frame 6 which serves to maintain the stack under sufficient compression to prevent leaks and to maintain dimensional stability to achieve optimum fuel cell stack assembly results. The fuel cell stack holder frame 6 comprises a top plate 8 positioned on the top of the stack and a bottom plate 10 positioned on the bottom of the stack. These are typically flat, rigid plates which do not bend when the fuel stack is under compression. Each of the top and bottom plates has ears or extensions 16 and 18 that extend out over the edges of the fuel cell stack assembly 4 and am generally located at the four corners of the plates. The holes 21 in the ears 16 of the top plate being aligned with the holes 23 in the bottom plate 10. This alignment permits placement of tie rods 14 running vertically through the holes in the bottom plate to the aligned hole in the top plate. Once the tie rods 14 are in position they are secured by nuts 20 threaded onto the tie rods 14 at the top plate 8. It is desirable to have an electrically insulating washer 22 positioned between the nut 20 and the top plate 8 to both secure the nut and electrically insulate the tie road from the cell stack. At the hole in the bottom plate 10 a nut 40 is positioned on the top surface 42 of the bottom plate 10 and a second nut 44 is threaded onto the tie rod end on the underside 46 of the bottom plate 10. These two nuts 40 and 44, when tightened, will secure the compression placed on the fuel cell stack assembly and maintain that compression. An electrically insulating washer 45 is placed between the nut on the top surface 42 of the bottom plate 10 and the nut 44 on the underside surface 46 of the bottom plate 10. This will assist in electrically insulating the fuel cell stack from anything coming in contact with the tie rods and consequently the rigid frame. The electrically insulating washers may be made of any electrically insulating material but are typically made of ceramic or mica or glass bonded mica.

The tie rods 14 are attached at all four ears of the top and bottom plates 8, 10 and are tightened systematically to achieve the desired compression on the fuel cell stack assembly 4. Using the current configuration this may be achieved by first tightening the nuts 20 at the top plate 8 or the nuts 44 positioned at the underside surface 46 of the bottom plate 10 to achieve the tension while maintaining the plates essentially parallel with the fuel cells. Then once the proper tension is achieved the rods may be locked into position by tightening the nuts 40 positioned on the top surface 42 of the bottom plate 10.

Once the stack is complete it may be affixed to the rigid transport frame 27. The transport frame 27 acts to stabilize the fuel cell stack assembly 4 during transportation to the site or during any activity which may cause undesirable movement to the fuel cell stack assemby 4 such as an earthquake. The rigid frame 27 has top beams 28 and bottom beams 30 which are located above the top of the fuel cell stack assembly and below the bottom of the fuel cell stack assembly. In addition, side supports 32 and 34 are positioned vertically on at least two opposing sides of the fuel cell stack assembly 6 and rigidly fixed to the top beams 28 and the bottom beams 30 of the rigid frame 27. The top beam 28 having an inner surface 29 facing the top of the fuel cell stack assembly 4 and having electrically insulated attachment device 46 which in the horizontal plane rigidly connects the top plate 8 of the fuel cell stack frame 6 to the inner surface 29 of the top beam 28 of the rigid mounting frame 27.

The bottom beam 30 of the rigid frame 27 also having an inner surface 48 facing the bottom plate 10 of the fuel cell stack frame 6 and having at least raised mounts 50 (typically four) on which the fuel cell stack frame 6 is rigidly affixed. The mounts 50 have receiving holes 52 through which the ends of the tie rods 14 can be fitted and affixed using a nut 56 threaded onto the tie end rod and a washer 58.

Figure 3:
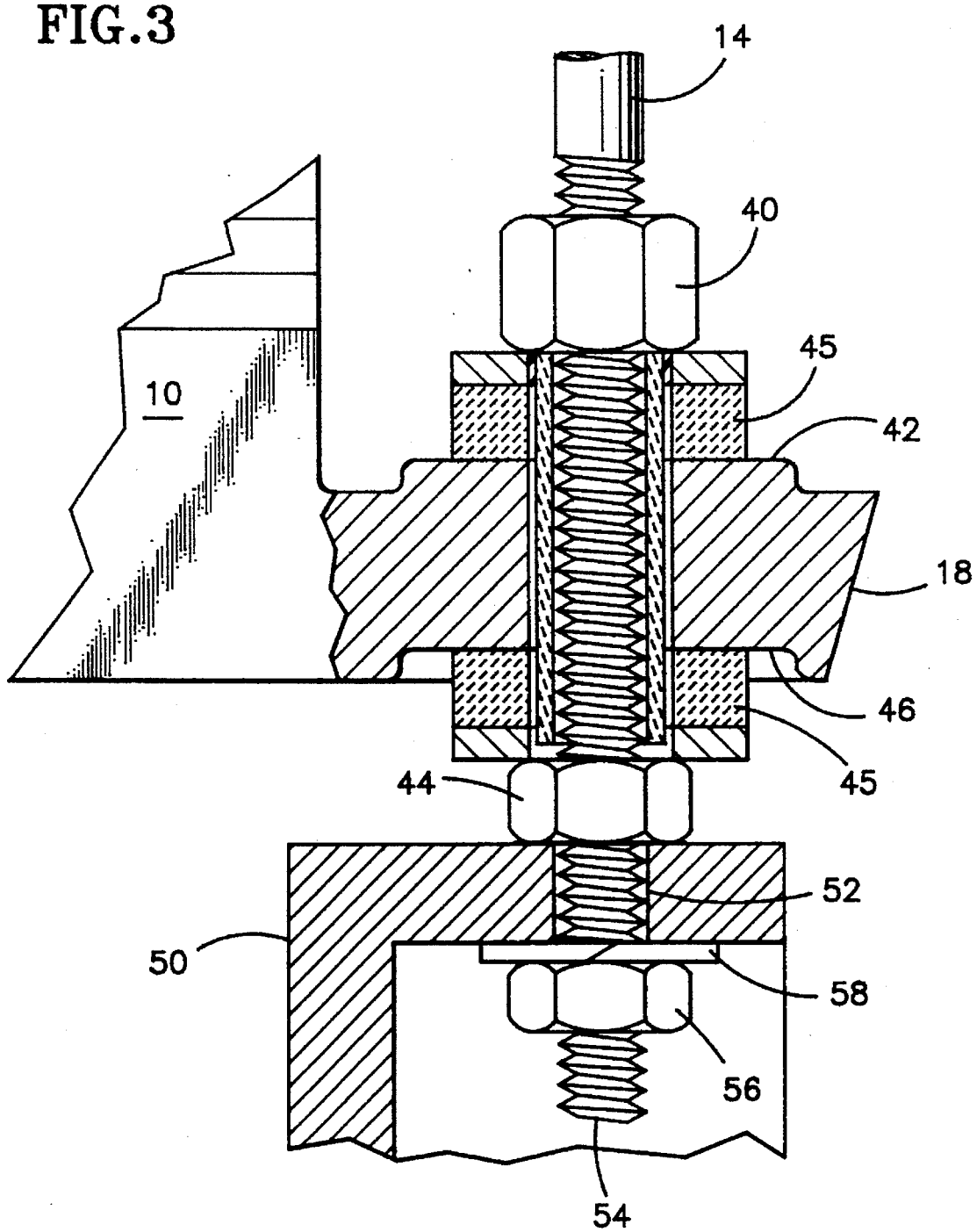
FIG. 3 is a depiction of section A of FIG. 2 showing the fixed end of the connector to the bottom beam of the transport frame.

An alternate approach to split the tie rod at nut 40 (FIG. 3) into two parts, an upper tie rod 14 and a lower short tie rod 54 that would be coupled at nut 40. This allows mounting bottom plate 18 with insulators 45 to bottom frame mounts 50 prior to installing the fuel cell assembly and applying the compressive load.

The materials used to prepare the frame, plates, beams, rods and nuts may be made of structural steel or other rigid material.

The principal advantages of this frame over the frames of the prior art am putting the bottom mounting insulating material in compression where it is strongest, and that by moving the mounting points to positions under the ears of the bottom plate, the fuel cell stack is more stable. This permits the rigid frame to be lighter and thinner in structure than the prior art, since the fragile insulators have been removed and the fuel cell stack would have a smaller moment of movement due to the more stable fixture means.

Naturally this invention has been described in a single embodiment but those skilled in the art would understand that alternate embodiments are contemplated.

We claim:

1. A fuel cell stack mounting apparatus comprising a fuel cell stack assembly having a plurality of fuel cells each having an anode and a cathode electrode positioned on opposite sides of an electrolyte and gas flow fields to direct a fuel and an oxidant to the anode and cathode respectively; comprising a stack holder for fixing the fuel cells in position under compression within the stack assembly said stack holder having a top end plate positioned at the top of the fuel cell stack and parallel to the fuel cell stack electrodes and a bottom end plate positioned at the opposite end of the fuel cell stack assembly and also parallel to the fuel cell electrodes, the top end plate and the bottom end plate each having four corners and each corner having an opening therethrough, and a tie rod, positioned through each of said holes in said top plate and passing through a hole in said bottom end plate such that tie rods are substantially parallel to said fuel cell stack assembly; and wherein said tie rod end is fixed in place at said top plate has an electrically insulated sleeve positioned about the tie rod end in contact with the top plate and an electrically insulating washer positioned between the tie rod end and a fixing means securing the tie rod end in place at the top end plate; and wherein the opposite tie rod end is threaded and passes through the bottom end plate and is fixed in place thereto by two fixing means, one fixing means positioned on one side of the bottom end plate and a second fixing means positioned on the opposite side of the bottom end plate, a dielectric sleeve slidably disposed about the tie rod portion in contact with the bottom end plate and a second dielectric washer positioned between the end plate and the second fixing means; and wherein the said apparatus is mounted in a frame having a top beam and a bottom beam and wherein the two or more tie rods are affixed to the bottom beam of the frame and support the fuel cell stack assembly while electrically insulating the fuel cell stack assembly from the rigid frame.

2. A fuel cell stack mounting apparatus comprising a fuel cell stack assembly having a plurality of fuel cells each having an anode and a cathode electrode positioned on opposite sides of an electrolyte and a gas flow field to direct a fuel and an oxidant to the anode and cathode respectively; and a stack holder for fixing the fuel cells in position under compression within the stack said stack holder having a top end plate positioned at the top of the fuel cell stack and parallel to the fuel cell stack electrodes said top end plate having four corners; and a bottom end plate positioned at the opposite end of the fuel cell stack and also parallel to the fuel cell electrodes, said bottom end plate also having four corners positioned substantially mirror image to the top end plate; and four tie rods wherein each tie rod is fixed in place at one corner of the top end plate and extending down to the mirror image corner of the bottom end plate; and wherein said tie rod end at said top plate has an electrically insulated sleeve positioned about the tie rod end in contact with the top plate and an electrically insulating washer positioned between the tie rod end and a fixing means to secure the tie rod end at the top end plate; and wherein the opposite tie rod end is threaded and passes through the bottom end plate and is fixed in place thereto by two nuts, one positioned on one side of the bottom end plate and a second nut positioned on the opposite side of the bottom end plate, a dielectric sleeve slidably disposed about the tie rod portion in contact with the bottom end plate and a second dielectric washer positioned between the underside of the bottom end plate and a second securing nut.

3. The apparatus of claim 2 wherein the tie rod end fixed in place at said bottom end plate is further fixed in place to the bottom beam of the fuel cell support frame.

* * * * *